United States Patent [19]

Sakamoto

[11] Patent Number: 4,978,693
[45] Date of Patent: Dec. 18, 1990

[54] POLYPHENYLENE OXIDE MOLDINGS RADIATION CROSSLINKED WITH (METH)ACRYLATED PHOSPHORIC ACID OR ADMIXTURES

[75] Inventor: Yoshito Sakamoto, Osaka, Japan
[73] Assignee: Sumitomo Electric Industries, Ltd., Osaka, Japan
[21] Appl. No.: 225,422
[22] Filed: Jul. 28, 1988
[30] Foreign Application Priority Data Jul. 28, 1987 [JP] Japan ............... 62-189473
Sep. 16, 1987 [JP] Japan ............... 62-233269

[51] Int. Cl.$^5$ ............... C08F 283/08; C08F 291/18; C08K 5/10; C08K 5/3492
[52] U.S. Cl. ............... 522/137; 522/144; 525/391; 525/392
[58] Field of Search ............... 522/144, 137; 525/391, 525/392

[56] References Cited

U.S. PATENT DOCUMENTS 3,356,761 12/1967 Fox ............... 522/145
3,373,226 3/1968 Gowan ............... 522/162
4,438,190 3/1984 Ishimaru ............... 522/171
4,623,558 11/1986 Lin ............... 522/142

FOREIGN PATENT DOCUMENTS 1694287 6/1966 Fed. Rep. of Germany .

OTHER PUBLICATIONS

Patent Abstracts of Japan, vol. 10, No. 258 (C-370) [2314], Sep. 4, 1986 & JP-A-61 83 223 (Matsushita Electric Works Ltd) 04-26-1986.

Primary Examiner—Marion C. McCamish
Assistant Examiner—Arthur H. Koeckert
Attorney, Agent, or Firm—Lowe, Price, LeBlanc, Becker & Shur

[57] ABSTRACT

A molding of modified polyphenylene oxide resin comprises a composite of modified polyphenylene oxide containing polyphenylene oxide having structure expressed in the following general formula (I) as a basic skeleton, which resin composite preferably contains a cross linking agent, more preferably phosphoric ester serving as a cross linking agent, while the molding is cross-linked by irradiation to ionizing radiation:

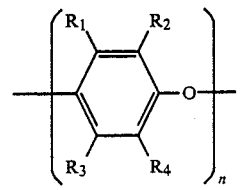

where $R_1$, $R_2$, $R_3$ and $R_4$ represents univalent substituents selected from a group of hydrogen, alkyl group, halogen, alkoxyl group and haloalkoxyl group, and n represents a natural number.

5 Claims, 1 Drawing Sheet

POLYPHENYLENE OXIDE MOLDINGS RADIATION CROSSLINKED WITH (METH)ACRYLATED PHOSPHORIC ACID OR ADMIXTURES

BACKGROUND OF THE INVENTION

1. Field of the Invention

The present invention relates to a molding which is obtained by shaping a composite of modified polyphenylene oxide resin into a configuration suitable for use.

2. Description of the Prior Art

Modified polyphenylene oxide resin, which is obtained by mixing or grafting thermoplastic resin such as polystyrene into polyphenylene oxide (PPO) such as poly-2,6-dimethylparaphenylene oxide, is widely applied to a material for parts of various electric products or the like, due to its excellence in dimensional stability and electrical property.

However, since such modified PPO resin is noncrystalline and inferior in flexibility, strain is left in shaping to easily cause cracking upon contact with a solvent of ketone, a plasticizer for polyvinyl chloride (PVC) or the like. Thus, modified PPO resin cannot be employed in such a field that the same may be brought into contact with such a chemical. For example, an electrical part formed by modified PPO resin may be cracked if the same is in contact with a PVC-covered conductor. Such cracking is caused by a plasticizer added to PVC.

The aforementioned problem has generally been solved by a method of introducing crystalline resin such as polyamide into a composite of modified PPO resin to decrease residual strain by relaxing stress applied in crystallization so that no cracking is caused by a solvent, or a method of adding highly flexible elastomer to a composite of modified PPO resin to suppress residual strain. In either method, however, a second component is added in a large amount to sacrifice original electrical property and heat resistance of the modified PPO resin. When crystalline resin is added, such a new problem is caused that the rate of mold shrinkage is increased or a warp or a sink mark is caused by difference in crystallization between parts.

SUMMARY OF THE INVENTION

An object of the present invention is to provide a molding of a modified PPO resin composite, which can suppress the lowering of various characteristics, such as heat resistance, electrical property and flame resistance, of modified PPO resin to the utmost, and prevent cracking caused by contact with a solvent or a plasticizer.

A resin molding according to the present invention comprises a composite of modified polyphenylene oxide resin containing polyphenylene oxide having structure expressed in the following general formula (I) as a basic skeleton, which composite is cross-linked by irradiation to ionizing radiation:

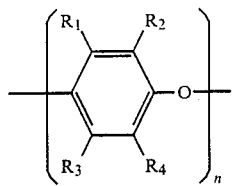

where $R_1$, $R_2$, $R_3$ and $R_4$ represent univalent substituents selected from a group of hydrogen, alkyl group, halogen, alkoxyl group and haloalkoxyl group, and n represents a natural number.

In relation to the present invention, the term "modified PPO resin" indicates a resin which is obtained by mixing or grafting a thermoplastic resin such as polystyrene or polyamide into polyphenylene oxide (PPO) such as poly-2,6-dimethylparaphenylene oxide.

According to the present invention, the resin is cross-linked to provide a three-dimensional network structure, so that no cracking is caused by a solvent or the like. Although a minimum internal strain of the resin is still left by this method, any infiltration by a solvent is extremely suppressed in practice by cross linking, whereby cracking can be sufficiently and effectively prevented.

According to the present invention, an electron beam and gamma rays may be employed as ionizing radiation. The type of ionizing radiation can be arbitrarily selected depending on the configuration of the molding to be irradiated to the same. The radiation dose is preferably within a range of 0.5 to 80 Mrad. If the radiation dose is smaller than 0.5 Mrad, sufficient cross linking cannot be attained. If the radiation dose is in excess of 80 Mrad, on the other hand, cross linking cannot be attained in a degree proportional to the radiation dose, and the use of such high radiation leads to cost disadvantages.

A commercially available product of a modified PPO resin of an arbitrary grade can be employed in the present invention. If a sufficient degree of cross linking cannot be attained by simply applying ionizing radiation to such a commercially available product of a modified PPO resin, a cross linking agent such as a multifunctional monomer is preferably added to the product of the modified PPO resin, to thereby provide a resin composite.

Examples of well-known cross linking agents are triallyl cyanurate, triallyl isocyanurate, trimethylol propane trimethacrylate, trimethylol propane triacrylate and the like. These cross linking agents can be employed in the present invention, as a matter of course.

If the cross linking agent is added in a large amount, however, the original mechanical and electrical properties of the resin itself are reduced while the cost is increased since such a cross linking agent is high-priced. Further, if the radiation dose required for cross linking is increased, the cost is increased reducing profitability. Particularly when gamma rays are employed, several days are required to merely apply 10 Mrad, and hence it is difficult to use the same general technique for working a resin molding.

Therefore, the inventor has studied a cross linking agent prepared with a compound having various functional groups to cause cross linking in small amounts and with a small radiation dose. It has been recognized through such study that a phosphoric ester having unsaturated group is particularly suitable as a cross linking agent to be employed in the present invention. The inventor has further discovered that a phosphoric ester having an unsaturated group can be effectively applied as a cross linking agent when compared with triallyl cyanurate, to attain substantially equivalent cross linking density with a radiation dose of less than half that of triallyl cyanurate.

Examples of such phosphoric ester are 2-methacryloyloxyethyl acid phosphate, 2-acryloyloxyethyl acid phosphate, diphenyl-2-methacryloyloxyethyl phosphate, diphenyl-2-acryloyloxyethyl phosphate, dibutyl-methacryloyloxyethyl phosphate, dibutyl-2-acryloyloxydiethyl phosphate, dioctyl-2-methacryloyloxyethyl phosphate, dioctyl-2-acryloyloxydiethyl phosphate and the like. Such phosphoric ester having unsaturated group can be employed with another cross linking agent such as triallyl cyanurate or triallyl isocyanurate, to attain good cross linking efficiency.

The molding of the resin composite according to the present invention can be used with various additives such as a colorant, a stabilizer, a flame retardant, an inorganic filler etc., depending on its use.

These and other objects, features, aspects and advantages of the present invention will become more apparent from the following detailed description of the present invention when taken in conjunction with the accompanying drawings.

DESCRIPTION OF THE PREFERRED EMBODIMENTS

In accordance with Examples 1 to 5 and reference examples 1 to 5 shown in Table 1, resin composites were prepared to form test pieces of 40 mm in length, 10 mm in width and 1 mm in thickness. Each test piece was irradiated to electron beam or gamma rays, for measurement of the gel ratio. Each molding thus irradiated to electron beam or gamma rays was extracted in xylene at 130° C. for 24 hours, thereby to obtain the gel ratio from the weight of the remainder after extraction.

Figure 1:
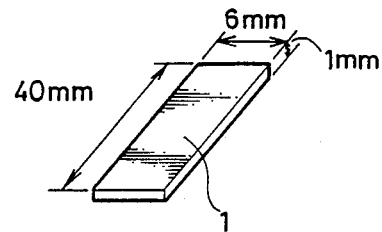
FIG. 1 is a perspective view showing a test piece employed for a solvent-cracking resistance test.

FIG. 1 is a perspective view showing each test piece 1.

Figure 2:
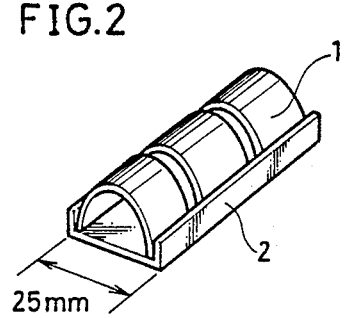
FIG. 2 is a perspective view showing a state of the test piece set in a frame for the solvent-cracking resistance test.
Figure 3:
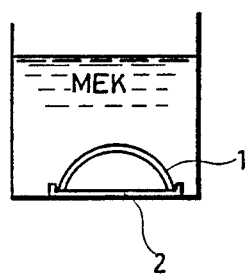
FIG. 3 is a sectional view showing a state of the test piece set in the frame and dipped in a solvent in the solvent-cracking resistance test.

The test piece 1 irradiated to electron beam or gamma rays was introduced into a frame 2, to be bent by application of stress as shown in FIG. 2. Then the test piece 1 was dipped in methyl ethyl ketone (MEK) for one minute as shown in FIG. 3, to examine whether or not cracking was caused. Table 1 shows the result.

As obvious from Table 1, it has been recognized that all of the test pieces according to Examples 1 to 5 of the present invention were sufficiently cross-linked with gel ratios of at least 40%. Further, no cracking was observed after dipping in MEK for one minute.

On the other hand, all of the test pieces according to reference examples 1 to 5 were 0% in gel ratio, and cracked after dipping in MEK.

Then, resin composites were prepared in accordance with Examples 6 to 17 at the ratios shown in Table 2, to provide test pieces in the form of sheets of 1 mm in thickness. In Examples 6 to 13, phosphoric ester was employed as a cross linking agent.

Each of the test pieces thus prepared was irradiated to electron beam or gamma rays, for measurement of the gel ratio. Similarly to Examples 1 to 5, each molding was extracted in xylene at 130° C. for 24 hours, thereby to obtain the gel ratio from the weight of the remainder after extraction. Table 2 shows the result. Due to the character of this test, it has been impossible to obtain correct values of the gel ratios indicated as "≦30" in Table 2.

As obvious from Table 2, all of the test pieces employing phosphoric acid as the cross linking agent were at high gel ratios, to be extremely improved in cross linking efficiency as compared with those employing triallyl cyanurate etc. as a cross linking agent.

Although the present invention has been described and illustrated in detail, it is clearly understood that the same is by way of illustration and example only and is not to be taken by way of limitation, the spirit and scope of the present invention being limited only by the terms of the appended claims.

TABLE 1

|  | Example | | | | | Reference Example | | | | |
|---|---|---|---|---|---|---|---|---|---|---|
|  | 1 | 2 | 3 | 4 | 5 | 1 | 2 | 3 | 4 | 5 |
| Noryl PX9406J[1] | 100 | 100 | 100 | 100 |  | 100 | 100 | 100 | 100 |  |
| Noryl 731J[2] |  |  |  |  | 100 |  |  |  |  | 100 |
| Triallyl Cyanurate |  | 5 | 10 |  | 10 |  | 5 | 10 |  | 10 |
| Triallyl Isocyanurate |  |  |  | 5 |  |  |  |  | 5 |  |
| Type of Radiation | Electron Beam | Electron Beam | Gamma Rays | Electron Beam | Electron Beam |  |  |  |  |  |
| Radiation Dose (Mrad) | 40 | 40 | 15 | 40 | 40 | 0 | 0 | 0 | 0 | 0 |
| Gel Ratio (%) | 41 | 55 | 46 | 58 | 49 | 0 | 0 | 0 | 0 | 0 |
| Solvent Cracking | No | No | No | No | No | Yes | Yes | Yes | Yes | Yes |

[1] trade name of modified PPO resin by ENGINEERING PLASTICS, LTD.
[2] trade name of resin blending with polystyrene resin by ENGINEERING PLASTICS, LTD.

TABLE 2

|  | Example | | | | | | | | | | | |
|---|---|---|---|---|---|---|---|---|---|---|---|---|
|  | 6 | 7 | 8 | 9 | 10 | 11 | 12 | 13 | 14 | 15 | 16 | 17 |
| Noryl 731J[1] | 100 | 100 | 100 | 100 | 100 | 100 | 100 | 100 | 100 | 100 | 100 | 100 |
| Phosphoric Ester A[2] | 10 | 20 | 20 | 10 | 10 |  |  |  |  |  |  |  |
| Phosphoric Ester B[3] |  |  |  |  |  | 20 |  |  |  |  |  |  |
| Phosphoric Ester C[4] |  |  |  |  |  |  | 20 |  |  |  |  |  |
| Phosphoric Ester D[5] |  |  |  |  |  |  |  | 20 |  |  |  |  |
| Triallyl |  |  |  | 10 |  |  |  |  |  | 10 | 20 |  |

TABLE 2-continued

| | Example | | | | | | | | | | | |
|---|---|---|---|---|---|---|---|---|---|---|---|---|
| | 6 | 7 | 8 | 9 | 10 | 11 | 12 | 13 | 14 | 15 | 16 | 17 |
| Cyanurate Triallyl Isocyanurate | | | | | 10 | | | | | | 20 | |
| Type of Radiation | Electron Beam | Electron Beam | Gamma Rays | Electron Beam | Electron Beam | Electron Beam | Electron Beam | Electron Beam | Electron Beam | Electron Beam | Electron Beam | Electron Beam |
| Radiation Dose (Mrad) | 20 | 15 | 15 | 10 | 10 | 15 | 15 | 15 | 20 | 15 | 15 | 20 |
| Gel Ratio (%) | 55 | 53 | 55 | 61 | 56 | 51 | 48 | 45 | ≦30 | ≦30 | ≦30 | ≦30 |

(1) trade name of modified PPO resin by ENGINEERING PLASTICS, LTD.
(2) 2-methacrylolyoxyethyl acid phosphate
(3) 2-acrylolyoxyethyl acid phosphate
(4) diphenyl-2-methacrylolyoxyethyl phosphate
(5) diphenyl-2-acrylolyoxyethyl phosphate

What is claim is:

1. A molding of modified polyphenylene oxide resin comprising a composite of modified polyphenylene oxide resin containing polyphenylene oxide having the formula (I) as a basic skeleton,

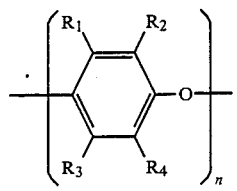

wherein
R$_1$, R$_2$, R$_3$, and R$_4$ represent univalent substituents selected from the group consisting of hydrogen, alkyl, halogen, alcoxyl and haloalkoxyl and
n represents a natural number,
the molding being cross-linked by ionizing radiation of 0.5-80 Mrad and the composite of modified polyphenylene oxide resin containing a phosphoric ester having an acrylate or methacrylate group as a cross-linking agent.

2. The molding of a modified polyphenylene oxide resin of claim 1 wherein
the phosphoric ester is selected from the group consisting of 2-methacryloyloxyethyl acid phosphate, 2-acryloyloxyethyl acid phosphate, diphenyl-2-methacryloyloxyethyl phosphate, diphenyl-2-acryloyloxyethyl phosphate and mixtures thereof.

3. The molding of modified polyphenylene oxide resin of claim 1, wherein
the ionizing radiation comprises an electron beam.

4. The molding of modified polyphenylene oxide resin of claim 1, wherein
the ionizing radiation comprises gamma rays.

5. The molding of claim 1, wherein
the cross-linking agent further comprises an agent selected from the group consisting of triallyl cyanurate, triallyl isocyanurate and mixtures thereof.

* * * * *